July 19, 1966 W. REUTER ET AL 3,262,071

RADIANT ENERGY SOURCE EMPLOYING EXPLODING GRAPHITE ROD

Filed March 26, 1962

INVENTORS
WILHAD REUTER
MIREK J. STEVENSON
JOHN C. WEBBER

BY Stephen J. Limanek
ATTORNEY

United States Patent Office 3,262,071

Patented July 19, 1966

3,262,071

RADIANT ENERGY SOURCE EMPLOYING EXPLODING GRAPHITE ROD

Wilhad Reuter, Mohapac, Mirek J. Stevenson, Briarcliff Manor, and John C. Webber, New Hamburg, N.Y., assignors to International Business Machines Corporation, New York, N.Y., a corporation of New York Filed Mar. 26, 1962, Ser. No. 182,250

5 Claims. (Cl. 331—94.5)

Figure 1:
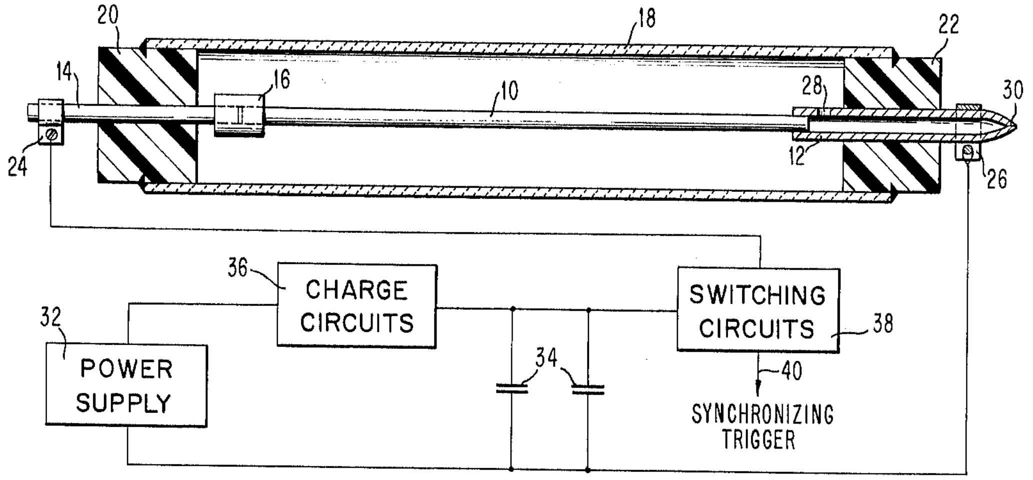

This invention relates to improved radiant energy sources and more particularly to apparatus for producing high intensity electromagnetic radiation at infrared, visible and ultraviolet, that is, optical, frequencies.

On many occasions it is necessary or at least very desirable to produce a short intense pulse of optical energy. Such a pulse has been produced, as is known, by exploding a fine metallic wire. Suitable exploding wires may be made of, for example, tungsten, copper and aluminum, which can readily conduct large current therethrough. In order to explode one of these wires, large currents are passed through the wire by connecting the wire across a charged high voltage capacitor which rapidly releases its energy.

The wire explosion is characterized by two phases:

(1) A heating phase, during which the wire is heated to a melting temperature.

(2) A diffusion phase, during which droplets are diffused into vaporized gas.

The heating phase lasts only from a fraction of a microsecond to several microseconds. The wire melts at the end of this period into a number of small droplets suspended like aerosol in air.

During the diffusion period the electrical resistance gradually decreases and the diffused droplets take on a character of a gas similar to a gas suitable for gas discharges. Initially when the gas density is high and the droplets are only slightly dispersed, that is, separated by only short distances from each other, the resistance is high. This is due to the fact that the mean free path of electrons is so short that electrons cannot acquire sufficient energy to ionize other atoms by impact. The principal sources of carriers at this stage are thermionic emission and field emission. At the end of the diffusion period the pressure drops sufficiently providing much greater mean free path for electrons and avalanching occurs with consequently much lower resistance. The explosion is caused principally by the high current conduction during the gas phase.

At times it is necessary to use not only a pulse of high intensity radiations but high intensity radiations at only one narrow band of frequencies. When wires, such as those mentioned hereinabove, are exploded they often produce high intensity radiations at widely scattered frequencies. These frequencies may not include those in a desired band or, if available, in a desired band that may be of insufficient intensity.

An important present day need for high intensity radiation sources at selected frequencies is in the operation of lasers or optical masers for producing coherent optical radiations. As is known it is necessary to apply to optically pumped lasers, more specifically, to the active or negative temperature medium thereof, radiations of particular absorption frequencies dependent upon the characteristics of the laser to be used. Furthermore, for each of the known lasers it is not only necessary to provide pumping radiation in the absorption band thereof but also to provide radiations of an intensity sufficient to exceed a threshold value at which oscillations are produced in the active medium of the laser so as to generate a coherent output wave. Radiations at frequencies without the absorption band not only reduce the efficiency of the pumping source but when applied to the active medium of the laser tend to render the laser inoperative by producing heat therein.

Many materials are known which when exploded produce desirable spectral lines useful for optically pumping lasers, but in many instances these materials cannot be produced in the form of conductive wires suitable for use in explosion techniques for the production of optical radiation.

Accordingly, an object of this invention is to provide an improved radiant energy source for producing predetermined spectral lines by exploding pressed powder rods.

Another object of this invention is to provide an improved source for producing high intensity radiation at predetermined discrete optical frequencies with no appreciable background radiation.

A further object of this invention is to provide an improved radiation energy source for producing predetermined discrete optical frequencies with no appreciable background radiation by using explosion techniques.

Yet another object of this invention is to provide a radiation source producing spectral lines using explosion techniques which does not require the use of wires.

Yet a further object of this invention is to provide an improved radiation source capable of producing high intensity radiation at selected frequencies with no appreciable background radiation.

Still a further object of this invention is to provide an improved radiation source capable of producing high intensity radiation at selected frequencies without appreciable radiation at undesirable frequencies by employing explosion techniques.

In accordance with the present invention, a high intensity radiant energy source is provided by coupling to a high voltage source a rod formed of pressed powder, e.g., graphite, which carries any material for producing high intensity radiations at selected frequencies.

An important advantage of this invention is that explosion techniques for producing radiant energy may be used for materials other than those which may be made in the form of a conductive wire.

An important feature of this invention is that high intensity radiations are capable of being produced at selected frequencies without the presence of undesirable background radiation.

The foregoing and other objects, features and advantages of the invention will be apparent from the following more particular description of preferred embodiments of the invention, as illustrated in the accompanying drawings.

Figure 2:
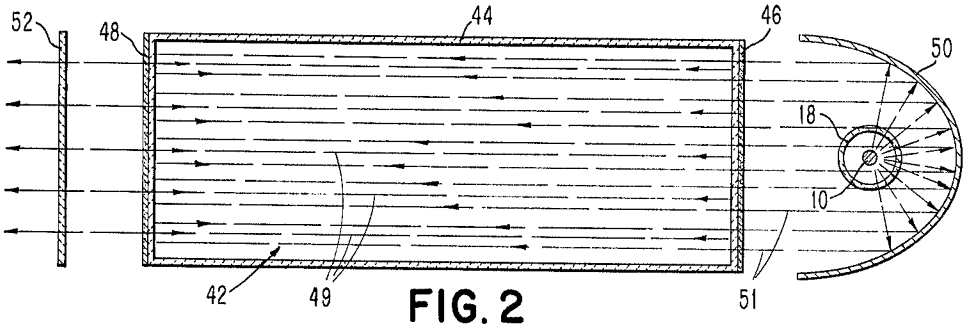
Figure 3:
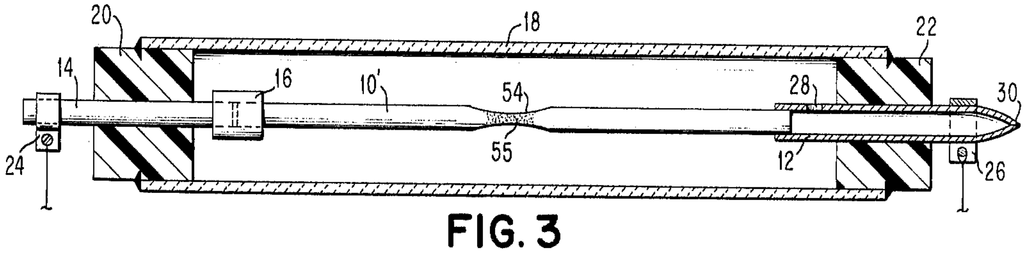
Figure 4:
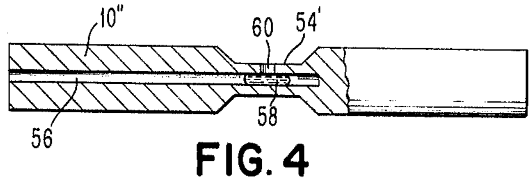

In the drawings:

FIG. 1, shows, partly in a sectional view, an embodiment of the radiant energy source of the present invention, FIG. 2 illustrates apparatus for producing coherent optical radiation utilizing the source illustrated in FIG. 1, FIG. 3 illustrates a graphite rod suitable for use in the embodiment shown in FIG. 1 for providing substantially a point source of radiation, and FIG. 4 illustrates a rod which is a modification of the rod shown in FIG. 3.

Referring to the drawings in more detail, FIG. 1 shows an embodiment of the radiation energy source which includes a graphite rod 10 supported at one end by a hollow electrode 12 and at the other end by a solid electrode 14 through a coupler 16. The rod 10, the electrodes 12 and 14 and the coupler 16 are made of an electrically conductive metal, such as, copper or brass, and may be firmly held together by welding, bonding or other such techniques so as to insure good electrical interconnections. A transparent tube or cylinder 18, which may be made of quartz, Pyrex or a filter glass, is disposed concentrically about the rod 10. A first plug 20 is inserted into one end of the transparent tube 18 and a second plug 22 is inserted into the other end of the transparent tube 18. These plugs 20 and 22 are preferably made of an insulating material, such as, an epoxy resin. The solid electrode 14 is inserted through the first plug 20, protruding therethrough so as to be supportable by a first conductive holder or clamping device 24 and the hollow electrode 12 is inserted through the second plug 22, protruding therethrough so as to be supportable by a second conductive holder or clamping device 26. The medium within the tube 18 may be air or any suitable gas, or if desired, the tube 18 may be evacuated, by any suitable pumping system (not shown), through the hollow electrode 12 by providing an aperture 28 in the hollow electrode 12 and pinching or sealing off the hollow electrode 12 to provide a closed end portion as indicated at 30. The tube 18 is not necessary unless it is desired to explode the rod in a vacuum, in which case suitable seals, e.g., by the use of epoxy, should be made around and in the plugs 20 and 22. If the rod is not exploded in a vacuum and it is desired to use the tube 18, the tube 18 should be made so as to provide sufficient strength to withstand the explosion forces. In order to apply a voltage between the first and second holders 24 and 26 for exploding the rod 10, a power supply 32 is provided for supplying energy to a pair of capacitors 34 through suitable and well known charge circuits 36. The capacitors 34 are connected between the first and second holders 24 and 26 through appropriate switching circuits 38, from which a connection 40 may be provided for supplying a synchronizing trigger pulse, indicative of the instant of explosion of the rod, to any suitable auxiliary apparatus (not shown) such as an oscilloscope.

The graphite rod which has a resistivity of approximately $800\times10^{-6}$ ohm-cm. may be of a diameter of approximately 1 mm. and be several centimeters long depending upon available voltages and desired intensities. To provide a line source of radiation the rod 10 may have a uniform diameter throughout its length, as shown in FIG. 1. When a rod of uniform diameter is used care should be exercised that a good electrical connection is provided between the electrodes 12 and 14 and the rod 10 so as to prevent an undesirable discharge between one of the electrodes 12 or 14 and an end of the rod 10. Each of the two capacitors 34 used to successfully explode the rod 10 had a value of 100 microfarads and were charged up to 5000 volts.

In accordance with this invention, any material providing desired spectrographic lines may be introduced into the graphite rod to be exploded therein for providing electromagnetic radiations of these desired spectrographic lines without the production of undesired radiations from the carrier or holder of the doping material. Accordingly, materials which are incapable or very difficult to form as wires explodable in accordance with the prior art techniques may now be exploded by utilizing the arrangement of the present invention. The doping material may be applied to the outer surfaces of the rod 10 or it may be mixed into graphite powder and then pressed into a desired form for employment in the radiation source of the present invention. It has been found that a graphite rod used as a carrier for the impurities produces background radiation substantially weaker in intensity than the spectral lines observed for the added impurities.

In the operation of the present invention the power supply 32 and charging circuits 36 produce a high voltage across the two capacitors 34. When it is desired to produce a pulse of radiant energy from the graphite rod 10 doped with any suitable material the switching circuits 38 complete the electrical circuit between the capacitors 34 and the first and second holders 24 and 26 to supply large currents, in the order of thousands of amperes, in the rod 10 to produce the explosion of the rod 10 and the doping material contained therein.

In FIG. 2 there is shown a laser or optical maser which utilizes an active or negative temperature medium 42 in gas form. As is known, gas lasers require intense optical radiations in their respective very narrow absorption lines. Thus, by doping the rod 10 shown in FIG. 1 with a material providing spectral lines at desired frequencies for the laser, dependent upon the absorption spectrum of the gas employed, the source of FIG. 1 can be readily arranged to apply the desired radiations to the active medium 42 of the laser shown in FIG. 2. Known gases may be used as the active medium 42 in the laser illustrated in FIG. 2 for example, those mentioned in U.S. Patent No. 2,929,922. As shown in FIG. 2, the negative temperature medium 42 is disposed in a suitable container, for example, a glass container 44. Applied to one end of the glass container 44 is a first reflector 46 and at the other end a second reflector 48 each of which are suitable for reflecting approximately 99% of coherent radiation, indicated at 49, incident thereon produced within the active medium. The first reflectors 46 must also be suitable for passing pumping radiation, indicated at 51, into the active medium 42. The pumping source for the pumping radiation is the one shown in FIG. 1 of the drawing and is indicated in FIG. 2 by a transverse cross-section of the transparent tube 18 and the graphite rod 10 shown in FIG. 1. A parabolic reflector 50 is disposed about the rod 10 and transparent tube 18 so as to direct the pumping radiation through the first reflector 46 into the active medium 42. In order to provide more efficient use of the pumping radiation 51 passing through the active medium 42 from the graphite rod 10, the second reflector 48 should be capable of reflecting the pumping radiation as well as the coherent radiations produced in the active medium. A filter 52, disposed without the glass container 44 at the end thereof to which is applied the second reflector 48, is provided to pass the coherent radiation 49 but to prevent any of the pumping radiation 51 from passing therethrough in order to provide a highly monochromatic coherent optical output wave from the gas laser.

The embodiment of the radiation energy source illustrated in FIG. 1 is designed to provide a line source of radiation. At times it is more desirable to use a point source of radiation. In this event, in accordance with the present invention, there is shown in FIG. 3 a modified rod 10' which may be substituted for the rod 10 in the embodiment shown in FIG. 1 of the drawing. The modified rod 10' has a reduced portion 54 for controlling the point in the rod at which the explosion occurs since this portion 54 provides a relatively high resistance zone. The doping material is disposed in portion 54 of the rod 10'. It has been found that a suitable explosion is produced when the diameter of the restricted portion 54 is reduced to about 1 mm. and the diameter of the remaining portion of the rod is equal to approximately 6 mm.

A mercury radiation source which radiates ultraviolet and visible light was produced by applying a 10% solution of mercuric chloride, indicated at 55, to the reduced portion 54 of the rod 10' made of graphite. After evaporation of the solvent approximately 10 milligrams of mercuric chloride adhered to the graphite rod and the graphite and the mercuric chloride were exploded by applying to the ends of the graphite rod 5000 volts from the two capacitors 34 shown in FIG. 1 of the drawing.

The radiation pulse length was found to be of the order of 50 to 100 microseconds and the spectrum thereof contained all mercury lines with very high intensity. It was also found that the radiation output increased when the voltage applied to the pressed powder rods was increased but that a change in the capacitance of the capacitors 34 had no significant affect on the radiation output.

The radiation from the graphite rod 10 illustrated in FIG. 3 was compared with the output from a standard high pressure mercury lamp using the same electrical system shown in FIG. 1 for providing the voltages between holders 24 and 26. The comparison, as determined by spectrographic methods, showed that the radiation from the graphite rod 10′ of FIG. 3 was several orders of magnitude more intense than the radiation from the high pressure continuously operating mercury lamp.

The mercury radiation source produced by the embodiment illustrated in FIG. 3 of the drawing used mercuric chloride as the doping material. In accordance with this invention, pure mercury also may be exploded to provide the characteristic radiations therefrom by using a graphite rod 10″ of the type shown in FIG. 4 of the drawing. This graphite rod 10″ is provided with a recessed portion 54′ somewhat similar to the recessed portion 54 of rod 10′ shown in FIG. 3. Additionally, the graphite rod 10″ of FIG. 4 is provided with a bore 56 which passes longitudinally through the rod 10″ at the center thereof from one end of the rod to a point beyond the recessed portion 54′. In order to explode pure mercury, indicated at 58, in accordance with the present invention, the mercury 58 is passed through the bore 56 so as to dispose the mercury 58 therein at the recessed portion 54′ of the rod 10″. If desired, an aperture 60 may be provided in the reduced portion 54′ so as to permit the introduction of the mercury 58, or other doping material, into the bore 56 from the outer surface of the reduced portion 54′.

In the operation of the radiation energy source of the present invention using the graphite rod 10″ illustrated in FIG. 4, it can be seen that the large currents passing through the graphite rod 10″ also pass through the mercury 58 so as to simultaneously explode the graphite rod 10″ and the mercury 58, producing a radiation pulse having the characteristic spectral lines of mercury.

Accordingly, it can be seen that the present invention provides radiations which are capable of pumping lasers which have heretofore been inoperable because the output from prior art radiation sources at the required frequencies has been below the desired threshold for producing laser operation. More specifically, it can be seen that there has been provided improved radiation energy sources which produce high intensity radiations at only selected frequencies. Although the only doping materials specifically mentioned herein are mercury and mercuric chloride, it should be understood that all explodable elements, salts and powdered materials may be used to provide the selected frequencies.

While the invention has been particularly shown and described with reference to preferred embodiments thereof, it will be understood by those skilled in the art that various changes in form and details may be made therein without departing from the spirit and scope of the invention.

What is claimed is:

1. The method of generating radiant energy of predetermined optical frequency comprising the steps of:
   (a) providing a graphite rod having electrical terminals connected thereto and supporting a doping material intermediate to said terminals;
   (b) said doping material having the characteristic that upon explosion it is excited to emit radiation of said predetermined optical frequency;
   (c) and applying a voltage to said terminals having a magnitude sufficient to explode said rod and said doping material to thereby excite said doping material so as to produce radiation of said predetermined frequency.

2. The method of generating radiant energy of predetermined optical frequency comprising the steps of:
   (a) providing a graphite rod having electrical terminals connected thereto;
   (b) disposing on a portion of said rod between said terminals a doping material;
   (c) said doping material having the characteristic that upon explosion it is excited to emit radiation of said predetermined optical frequency
   (d) and applying a voltage to said terminals having a magnitude sufficient to explode said portion of said rod and said doping material to thereby excite said doping material so as to produce radiation of said predetermined frequency.

3. The method of generating radiant energy of predetermined optical frequency comprising the steps of;
   (a) providing a graphite rod having a first portion with a transverse cross sectional area substantially smaller than that of the remaining portion of said rod;
   (b) disposing on said first portion of said rod a doping material;
   (c) said doping material having the characteristic that upon explosion it is excited to emit radiation of said predetermined optical frequency
   (d) and applying a voltage to said rod across said first portion having a magnitude sufficient to explode said first portion of said rod and said doping material to thereby excite said doping material so as to produce radiation of said predetermined frequency.

4. The method of generating radiant energy of predetermined optical frequency comprising the steps of:
   (a) providing a graphite rod having electrical terminals connected thereto and having an opening therein between said terminals;
   (b) disposing a doping material in said opening;
   (c) said doping material having the characteristic that upon explosion it is excited to emit radiation of said predetermined optical frequency
   (d) and applying a voltage to said terminals having a magnitude sufficient to explode said rod and said doping material to thereby excite said doping material so as to produce radiation of said predetermined frequency.

5. The method of applying pumping energy to a negative temperature medium comprising the steps of:
   (a) arranging next to said negative temperature medium a graphite rod having electrical terminals and carrying a doping material between said terminals;
   (b) said doping material having the characteristic that upon explosion it is excited to emit radiation at a predetermined frequency corresponding to a pumping frequency for said negative temperature medium;
   (c) and applying a voltage to said terminals having a magnitude sufficient to explode said rod and said doping material to thereby excite said doping material so as to produce radiation of said predetermined frequency.

References Cited by the Examiner

UNITED STATES PATENTS

| | | | |
|---|---|---|---|
| 870,897 | 11/1907 | Murphy | 67—30 X |
| 1,770,121 | 7/1930 | Back | 67—31 X |
| 2,525,032 | 10/1950 | Hawkins et al. | 67—31 |
| 2,560,924 | 7/1951 | Brockman | 67—31 |
| 2,841,002 | 7/1958 | Dell et al. | 67—31 |
| 2,929,922 | 3/1960 | Schawlow et al. | 330—4 |
| 3,102,920 | 9/1963 | Sirons | 331—94.5 |

(Other references on following page)

OTHER REFERENCES

Brochure: "U.C.P. Spectrographic Electrodes," received by U.S. Patent Office Sci. Lib., Mar. 9, 1955; United Carbon Products Co., Inc., Bay City, Mich.; pages 7, 21–23, and the cover are relied upon.

Conn, "The Use of 'Exploding Wires' as a Light Source of Very High Intensity and Short Duration," J.O.S.A., vol. 41, No. 7, July 1951, pp. 445–449.

Twyman, "The Practice of Spectrum Analysis," compiled by F. Twyman, publ. by A. Hilger, Ltd., London, 5th ed., 1931, pp. 22 and 26–29 relied upon.

Zink: "A 'Vacuum Cup' Electrode for the Spectrochemical Analysis of Solutions," Applied Spectroscopy, vol. 13, No. 4, August 1959, pp. 4a and 94–97.

JEWELL H. PEDERSEN, *Primary Examiner.*

R. LAKE, *Examiner.*

D. R. HOSTETTER, R. L. WIBERT,
*Assistant Examiners.*